United States Patent
Feldman et al.

(10) Patent No.: US 7,161,734 B2
(45) Date of Patent: Jan. 9, 2007

(54) METHOD AND APPARATUS FOR CONTROLLING POWER TRANSIENTS IN AN OPTICAL COMMUNICATION SYSTEM

(75) Inventors: Robert D. Feldman, Middletown, NJ (US); Mahan Movassaghi, Middletown, NJ (US); David A. Sadler, Holmdel, NJ (US); William A. Thompson, Red Bank, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 10/853,836

(22) Filed: May 26, 2004

(65) Prior Publication Data

US 2004/0218258 A1 Nov. 4, 2004

Related U.S. Application Data

(62) Division of application No. 10/093,041, filed on Mar. 7, 2002, now Pat. No. 6,798,567.

(51) Int. Cl.
*H01S 3/00* (2006.01)

(52) U.S. Cl. .................................... 359/341.42; 398/25

(58) Field of Classification Search ............ 359/341.43, 359/341.42, 337.1, 337.4, 341.4; 398/25; 385/25

See application file for complete search history.

(56) References Cited

U.S. PATENT DOCUMENTS

| 5,668,658 | A | * | 9/1997 | Hamada ................ 359/341.43 |
| 6,064,501 | A | * | 5/2000 | Roberts et al. ............... 398/11 |
| 6,163,399 | A | | 12/2000 | Berg .......................... 359/341 |
| 6,222,652 | B1 | * | 4/2001 | Roberts ........................ 398/25 |
| 6,304,347 | B1 | | 10/2001 | Beine et al. ................. 359/110 |
| 6,317,255 | B1 | | 11/2001 | Fatehi et al. ........... 359/341.44 |
| 6,341,034 | B1 | | 1/2002 | Sun et al. ............... 359/341.41 |
| 6,342,959 | B1 | | 1/2002 | Haxell et al. ............... 359/124 |
| 6,356,386 | B1 | * | 3/2002 | Denkin et al. .............. 359/337 |
| 6,366,393 | B1 | * | 4/2002 | Feulner et al. ............. 359/337 |
| 6,433,925 | B1 | * | 8/2002 | Sakano et al. ......... 359/341.43 |
| 6,529,316 | B1 | * | 3/2003 | Treyz et al. ........... 359/337.11 |
| 6,603,822 | B1 | * | 8/2003 | Brede et al. ................ 375/340 |
| 6,798,567 | B1 | * | 9/2004 | Feldman et al. ....... 359/341.42 |
| 2003/0035206 | A1 | * | 2/2003 | Pavel et al. .............. 359/341.4 |

FOREIGN PATENT DOCUMENTS

JP 2000134156 A * 5/2000

* cited by examiner

*Primary Examiner*—Mark Hellner

(57) ABSTRACT

A method and apparatus for controlling transients in an optical signal propagating along an optical fiber path interconnecting a plurality of network elements employs a power threshold to determine an appropriate response given a change in optical signal power.

9 Claims, 4 Drawing Sheets

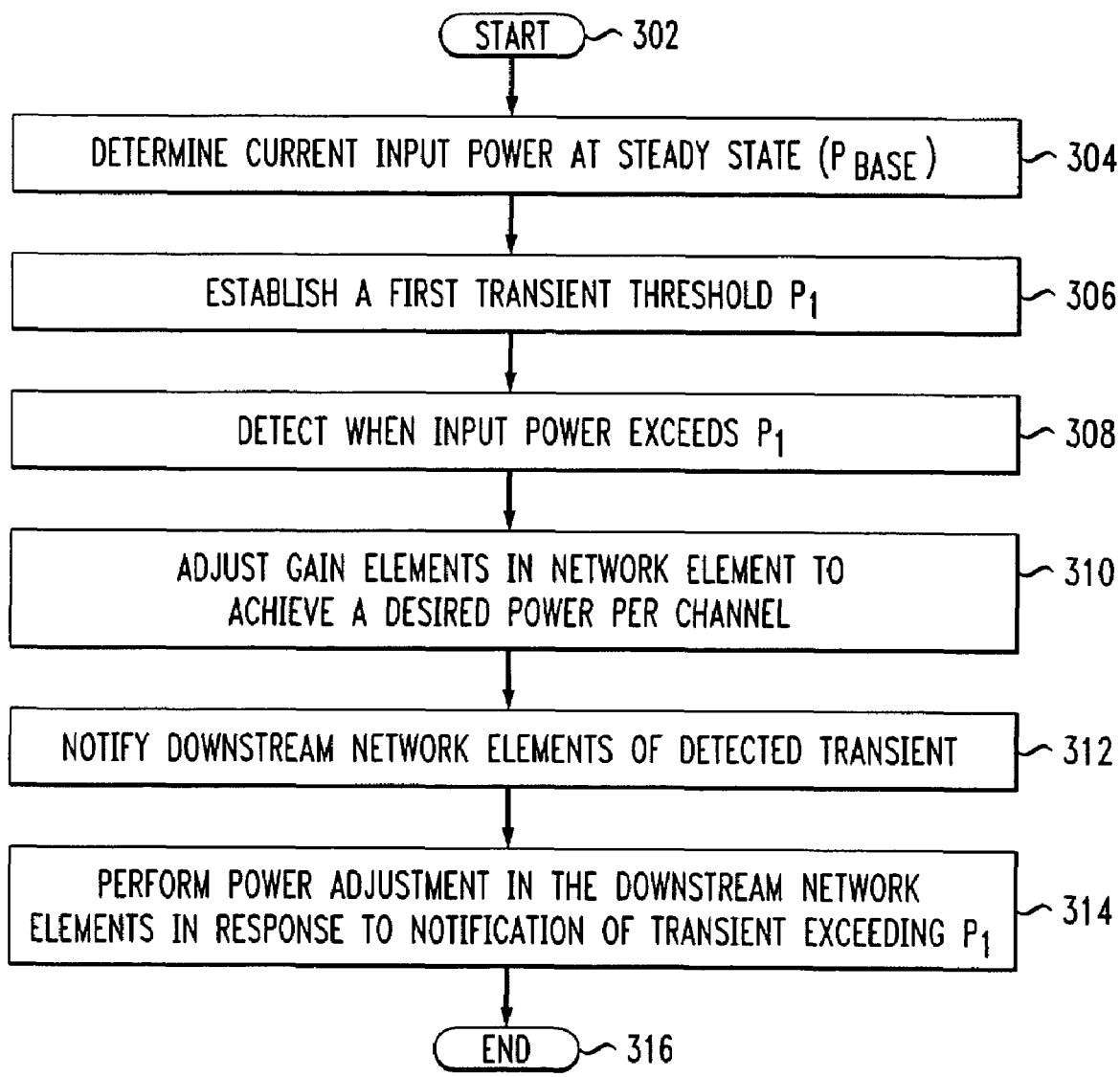

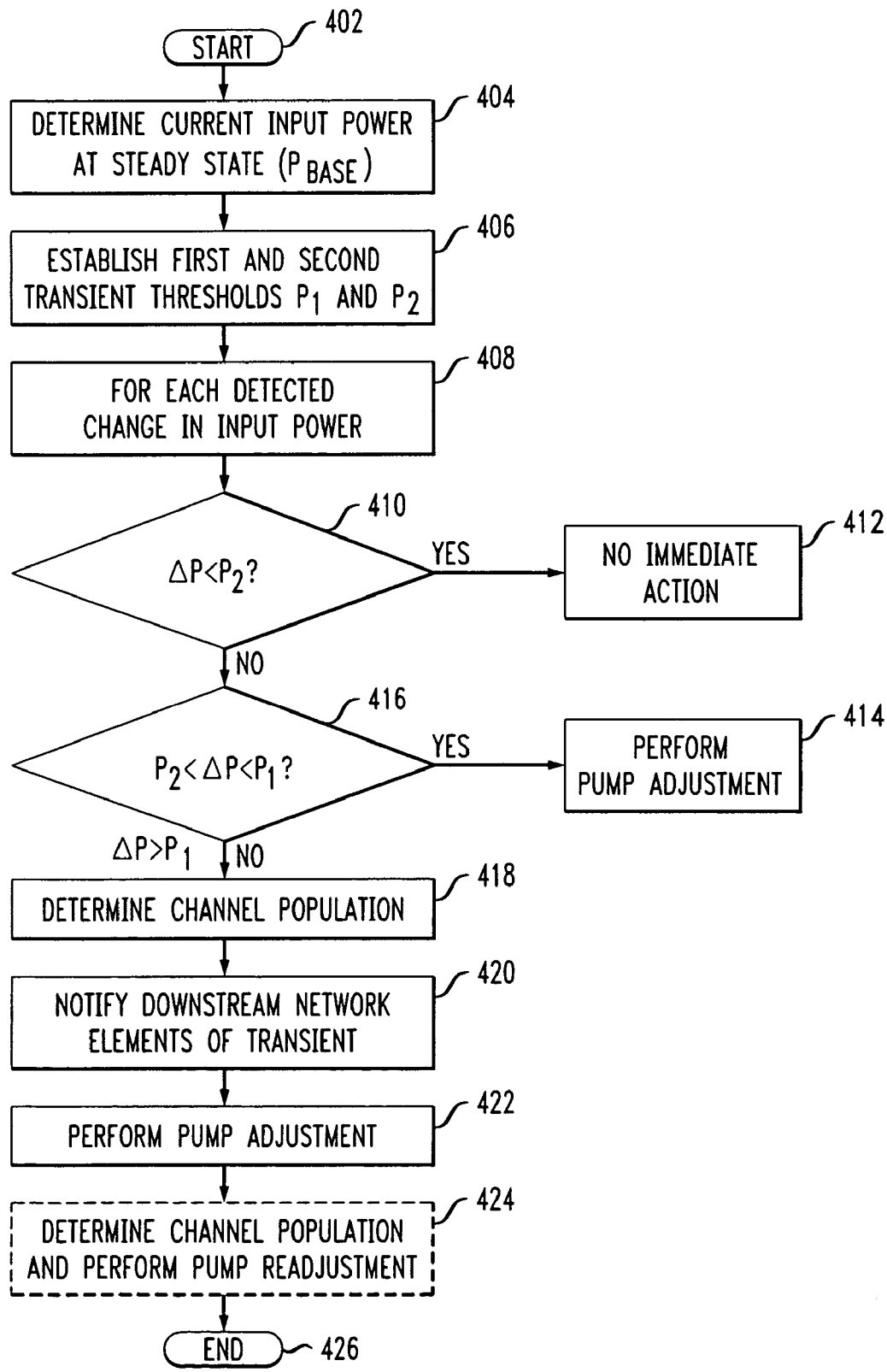

METHOD AND APPARATUS FOR CONTROLLING POWER TRANSIENTS IN AN OPTICAL COMMUNICATION SYSTEM

CROSS-REFERENCE TO RELATED APPLICATIONS

This application is a divisional of U.S. patent application Ser. No. 10/093,041, filed Mar. 7, 2002, now U.S. Pat. No. 6,798,567, which is incorporated by reference herein in its entirety.

BACKGROUND OF THE INVENTION

1. Field of the Invention

The present invention generally relates to lightwave communications systems and, more particularly, to a method and apparatus for controlling power transients in an optical communication system.

2. Description of the Related Art

In the field of fiber optic communications, it has been known for some time to increase the capacity of an optical communications link by propagating wavelength-division multiplexed (WDM) optical signals along optical fibers. Specifically, a WDM signal is composed of a plurality of distinct wavelengths of light, each such wavelength carrying a respective optical information signal, also known as an information channel. The number of wavelengths (i.e., information channels) in a WDM signal is a system parameter and usually ranges from 2 to 128 (in the case of "dense" WDM, or DWDM).

As the WDM signal travels through an optical network, it gradually fades and must be amplified at various points along its route. Optical amplifiers are typically provided throughout the optical network to maintain optical signal levels at their correct power settings. Transients caused by the instantaneous addition or removal of one or more individual optical information channels by an add/drop multiplexer or other device will affect the power of the WDM signal. Such transients can cause some channels to have power levels that are too high or low with respect to other channels. These transients can cause substantial degradation in the system's bit error rate and may affect service of the optical network.

SUMMARY OF THE INVENTION

The disadvantages associated with the prior art are overcome by a method and apparatus for controlling transients in an optical signal propagating along an optical fiber path interconnecting a plurality of network elements. The present invention detects a change in power of an optical signal in a first network element that exceeds a threshold. When the power of the optical signal exceeds the threshold, the first network element adjusts the power of the optical signal and transmits a transient notification to at least one additional network element. In one embodiment, the first network element adjusts the power of the optical signal by controlling at least one gain element disposed therein, to achieve a desired power per channel of the optical signal. In another embodiment, the present invention establishes a series of thresholds, and the response of the network elements disposed along an optical transmission line is dictated by which particular threshold has been exceeded.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a flow diagram depicting one embodiment of the transient control method of the present invention; and FIG. 4 is a flow diagram depicting another embodiment of the transient control method of the present invention.

DETAILED DESCRIPTION OF THE INVENTION

Figure 1:
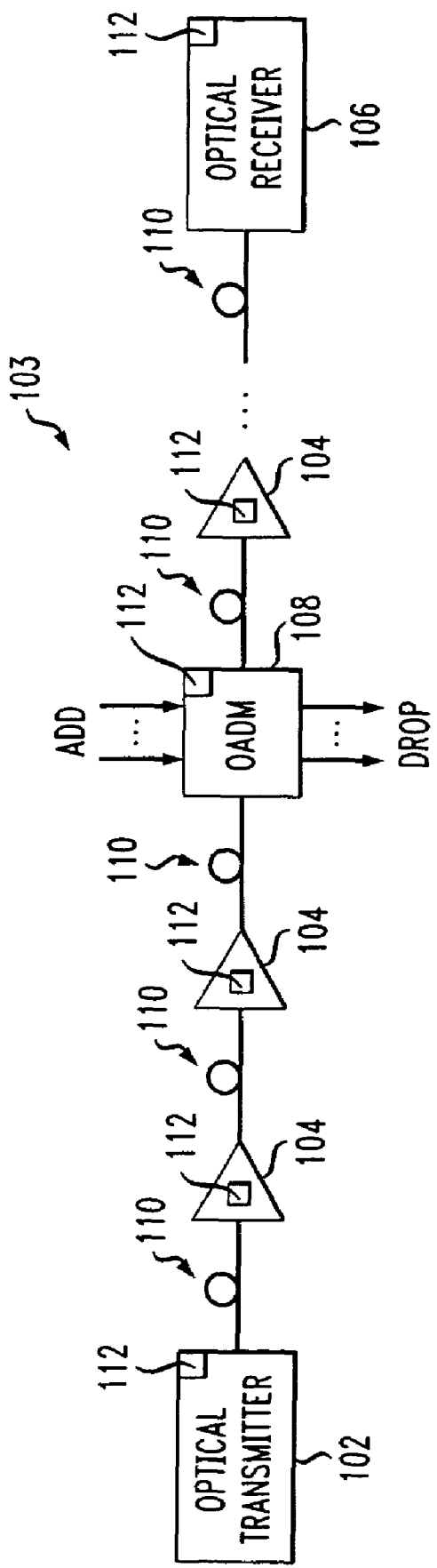
FIG. 1 shows a block diagram of one illustrative lightwave communication system embodying the principles of the present invention.

FIG. 1 depicts a block diagram of an illustrative lightwave communication system 100 embodying the principles of the present invention. The system comprises an optical transmitter 102, an optical transmission line 103, and an optical receiver 106. The optical transmitter 102 converts electrical data signals to optical data signals for transmission over a series of optical fiber spans 110 in the optical transmission line 103 to the optical receiver 106. The optical receiver 106 reconverts the optical data signals to electrical signals. The optical data signal typically comprises a plurality of wavelengths of light, each wavelength providing a different optical communication channel. For example, the lightwave communication system 100 supports many optical channels, illustratively 128 channels, each using a different optical carrier wavelength. Optical channels can be modulated at, for example, 10 Gbps. The carrier wavelengths are illustratively in the vicinity of 1555 to 1608 nm. These are merely illustrative system characteristics. If desired, more or less channels can be provided, signals may be modulated at a different rate, and a different range of carrier wavelengths can be supported.

The optical transmitter 102 can include laser diodes, each of which supports a channel operating at a different wavelength. If one or more of these lasers is taken out of service, or if new channels are added at the optical transmitter 102, the number of wavelengths being transmitted across the optical transmission line 103 may change abruptly. The number of channels being carried by the optical transmission line 103 can also change due to unexpected system failures, such as fiber cuts.

Figure 2:
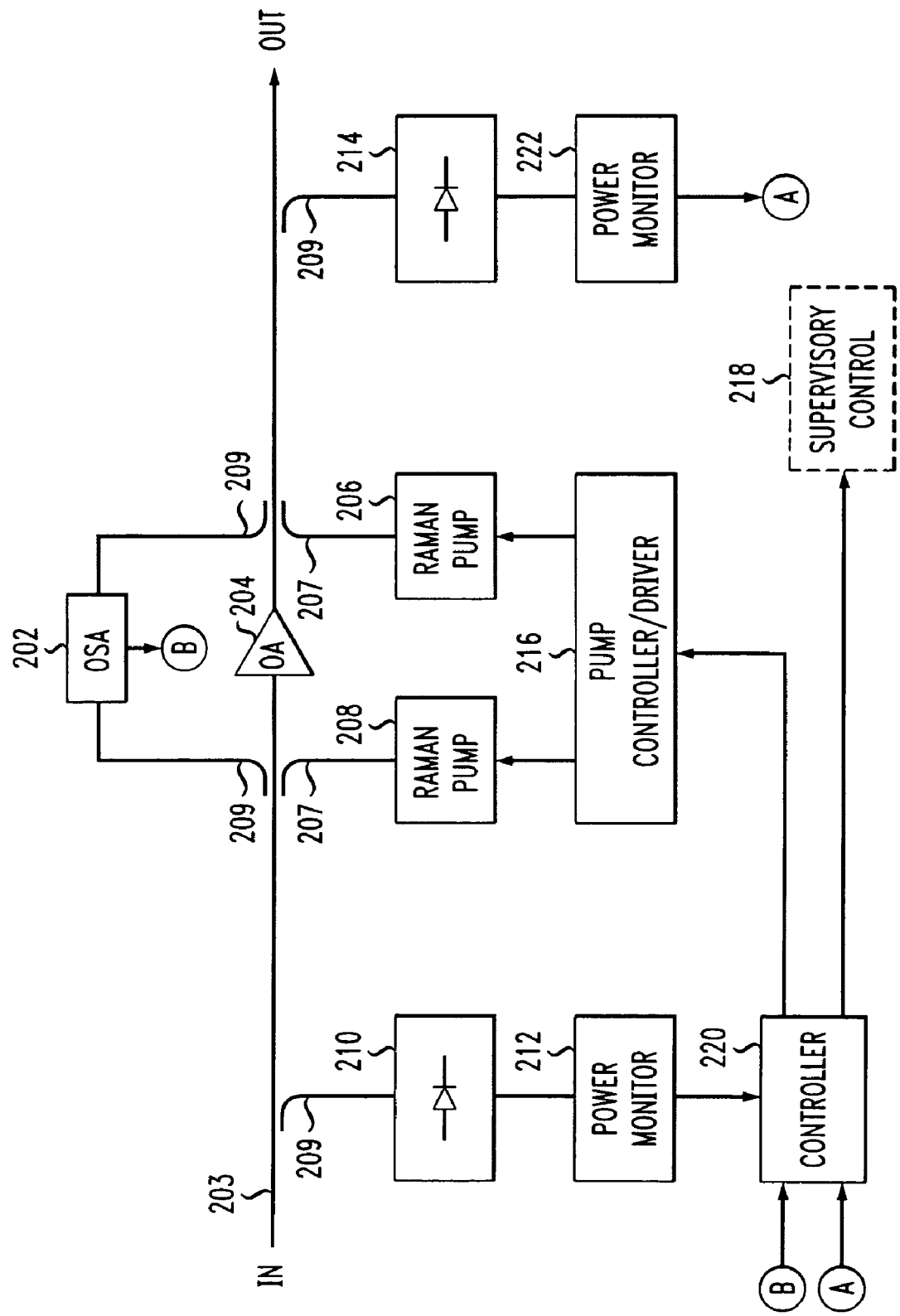
FIG. 2 shows a block diagram of an illustrative optical amplifier arrangement in a given network element of the lightwave communication system of FIG. 1.

In the present example, the optical transmission line 103 includes various network elements, such as multiple stages of repeaters 104 and an optical add/drop multiplexer (OADM) 108. In general, optical transmission line 103 could be any type of simple or complex arrangement of components. The repeaters 104 and OADM 108 are separated by the spans of optical fiber 110. Fiber spans may be on the order of 40–120 km in length for long-haul networks, or may be any other suitable length for use in signal transmission in a lightwave communication system. Repeaters 104 include gain elements (an example is shown in FIG. 2) for amplifying the optical data signal as it travels along the optical transmission line 103. The OADM 108 can be used to separate channels at certain wavelengths from the optical data signal. The separated channels may be provided to another network (not shown). In addition, the OADM 108 can be used to add channels at certain wavelengths to the optical data signal. The operation of add/drop multiplexers, such as OADM 108, is well known in the art. In some instances, the number of channels added to, or dropped from, the optical transmission line 103 by the OADM 108 can change abruptly.

As known by those skilled in the art, the total optical power of a signal propagating in a given fiber span 110 is the sum of the powers of the individual wavelength components. Thus, if a given fiber span 110 is initially carrying ten signal channels, the total input power to a network element coupled to the fiber span is relatively constant. If nine of the ten channels are suddenly dropped either by the OADM 108 or the transmitter 102, the total power input to a network element coupled to the fiber span is now one-tenth its original level. When this lower power signal is coupled to a saturated optical amplifier in the network element, the output power of the optical amplifier will be nearly unchanged. Thus, the single remaining channel will now have all of the power that was once distributed among ten channels, and the lightwave communication system may not be able to achieve good performance with the surviving channel having such a high power. In addition, since the output power of the network element will be substantially unchanged, downstream network elements will not be able to detect the transient immediately.

Furthermore, if the original channel population is, for example, 80 channels, and 78 of those channels are suddenly removed, the remaining two channels will have very high power as discussed above. The remaining two channels will also have very different power levels due to channel-to-channel and channel-to-amplifier interactions. These interactions are properly balanced for 80 channels, but now the amplifier settings must be adjusted for 2 channels.

FIG. 2 shows a block diagram of an illustrative optical amplifier arrangement in a network element embodying the transient control principles of the present invention. More specifically, a given network element comprises an optical amplifier 204 disposed along an optical fiber path 203. Optical amplifier 204 receives the optical signal from an upstream network element and supplies and amplified optical signal downstream along optical fiber path 203. For uniformity and ease of understanding in the following description, optical amplifier 204 is contemplated to be a rare earth-doped optical fiber amplifier, such as an erbium-doped fiber amplifier (EDFA), though other amplifiers, such as Raman amplifiers may also be employed.

In order to provide an amplifying effect, the optical amplifier 204 is "pumped" with luminous energy using techniques known in the art (internal pump sources not shown). The luminous energy, also referred to as pump light, generally has a shorter wavelength than any of the wavelengths in the optical signal. In addition, Raman pumps 206 and 208 can be used to further amplify the optical signal in optical fiber path 203 via Stimulated Raman Scattering (SRS). Specifically, Raman pump 208 provides counter-propagating pump light to the optical fiber 203. In this sense, Raman pump 208 serves as a pre-amplifier to the optical amplifier 204. Raman pump 206 provides co-propagating pump light to the optical fiber 203 to provide further downstream amplification of the optical signal. Raman pumps 206 and 208, as well as pumps in the optical amplifier 204 (not shown), can be semiconductor laser pump assemblies, such as laser diode pumps or any other suitable pump sources well known in the art. Optical couplers 207 are used to couple the pump light emitted by Raman pumps 206 and 208 to the optical fiber path 203. The use of optical couplers 207 for this purpose is also well known to those skilled in the art. Although the present invention is described with respect to a hybrid Raman amplifier-EDFA arrangement, other known arrangements of optical amplifiers and/or optical pumps can also be used without departing from the spirit and scope of the present invention.

An optical spectrum analyzer (OSA) 202 is coupled to the optical fiber path 203 at the input and output of the optical amplifier 204 via monitor ports 209. The output of the OSA 202 is coupled to controller 220. In general, the OSA 202 can monitor points along the optical fiber 203 at the inputs and outputs of various optical components comprising a network element. The OSA 202 is capable of monitoring several characteristics of the optical signal, such as signal-to-noise ratio, channel population, power distribution among the various channels, etc. The OSA 202 operates by periodically monitoring the optical signal characteristics (known as "scanning"), and reporting the characteristics to the controller 220 for a power adjustment, if necessary.

Additional monitoring taps 211 are coupled to the optical fiber path 203 for determining the input and output power levels of the optical signal at optical amplifier 204. Specifically, monitoring taps 211 are coupled to photodetectors 210. Photodetectors 210 could be any suitable device known to those skilled in the art (e.g., a photodiode) for detecting optical energy and converting the optical energy to an electrical signal. The electrical signals from the photodetectors 210 are processed through power monitors 212, which relate the photocurrent of their respective photodetector 210 to the power level of the optical signal in its electrical form. Suitable circuitry for each of the power monitors 212 is also well known in the art. The outputs of the power monitors 212 are also coupled to the controller 220.

Controller 220 is further coupled to a pump controller/driver 216 and, optionally, a supervisory control circuit 218. The pump controller/driver 216 adjusts the bias circuitry (not shown) of the optical amplifier 204 and Raman pumps 206 and 208 in order to achieve a desired power per channel of the optical signal. Supervisory control circuit 218 is optionally used to carry out specified control and management functions. In particular, supervisory control circuit 218 transmits a supervisory signal along optical fiber path 203 to the next network element on the optical transmission line. In another embodiment, supervisory control circuit 218 transmits the supervisory signal along another optical fiber path (not shown). As described in more detail below, the present invention optionally employs the supervisory signal to notify network elements downstream from a transient of the occurrence of the transient. This allows downstream network elements to adjust their power levels.

Operation of one embodiment of the present invention is best understood by simultaneous reference to FIGS. 2 and 3. FIG. 3 is a flow diagram illustrating one embodiment of a transient control method 300 in accordance with the present invention. The transient control method 300 is executed by the controller 220 in a given network element. Controller 220 can comprise a processor, a memory, support circuits, and other known processing components for executing the method 300 of the present invention.

At step 302, the transient control method 300 starts. At step 304, the controller 220 receives the current steady state input power $P_{BASE}$ supplied to the network element from an optical fiber span 110 (FIG. 1). The controller 220 receives the power reading from the power monitor 212 coupled to the input of optical amplifier 204. At step 306, controller 220 defines a first transient threshold $P_1$ such that input power exceeding $P_1$ requires a power adjustment in the network element, as well as power adjustments in one or more downstream network elements along the optical transmission line. In one embodiment, $P_1$ is selected to be the threshold level of input power change that requires an immediate adjustment in gain element settings in both the network element detecting the transients and one or more downstream network elements. $P_1$ can be a single value or be defined as a range of power levels.

At step 308, the power monitor 212 at the input of the optical amplifier 204 detects when the input power to the network element exceeds the first transient threshold $P_1$. As described above, a change in input power at a given network element can result from an abrupt change in channel population in the optical fiber. Although the present invention is described as monitoring input power to a network element in general, those skilled in the art understand that the present invention can monitor input power to any of the various components comprising a network element, such as an optical amplifier. The method 300 then proceeds to step 310, where the various gain elements in the network element are adjusted to achieve a desired power per channel in the optical signal. In the present embodiment, gain elements include optical amplifier 204 and Raman pumps 206 and 208.

At step 312, the network element transmits a transient notification to downstream network elements. As described above, in certain instances, gain elements within the network element may become partially or fully saturated such that their output power remains the same regardless of the change in input power. In this case, downstream network elements may not be able to detect the power transient without determining the channel population. Thus, the present invention advantageously transmits a transient notification to at least one downstream network element. In one embodiment, the network element employs a supervisory signal controlled by the supervisory control circuitry 218. In this embodiment, notification step 312 comprises setting a transient indicator in the SONET overhead of the supervisory signal. In another embodiment, the notification step 312 comprises supplying an additional optical signal, independent of the presence of the supervisory signal, for transmitting the transient indicator downstream. In yet another embodiment, the controller 220 causes the gain elements in the network element to "pulse" the optical signal in a way that the downstream network elements will detect the transient.

In any case, at step 314, the downstream network elements perform power adjustment in response to the notification of the transient. Again, this power adjustment can comprise adjusting gain elements to achieve a desired power per channel and notifying additional downstream network elements of the transient. At step 316, the method 300 ends.

FIG. 4 is a flow diagram of another embodiment a transient control method 400 of the present invention. Again, FIG. 4 should be simultaneously referenced with FIG. 2. At step 402, the method 400 begins. At step 404, the controller 220 receives the current steady state input power $P_{BASE}$ substantially as described above with respect to FIG. 3. In the present embodiment, the controller 220 establishes a first transient threshold $P_1$ and a second transient threshold $P_2$ at step 406. In one example, $P_2$ is defined as $P_{BASE} \pm 1$ dB, and $P_1$ is defined as $P_{BASE} \pm 3$ dB. That is, input power over the first power threshold (or range) $P_1$ would require a power adjustment in the network element, as well as power adjustments in one or more downstream network elements along the optical transmission line. Input power over the second threshold (or range) $P_2$ would be a moderate power excursion, requiring only local power adjustment within the network element. The values for $P_1$ and $P_2$ are exemplary, and can be modified as desired for a particular lightwave communication system.

At step 408, the power monitor 212 coupled to the input of the optical amplifier 204 detects a change in the input power ($\Delta P$) to the network element. Again, the input power can also be monitored at any of the various components comprising a network element. At step 410, the controller 220 determines whether or not the change in input power is greater than the second power threshold $P_2$. If the change in input power is less than the second power threshold $P_2$, controller 220 takes no immediate action to adjust the optical signal power at step 412. If a regularly scheduled scan by OSA 202 determines that there is a change in input channel count or power distribution, the normal transmission control algorithms are used to adjust the optical signal power.

At step 416, the controller 220 determines if the change in input power is between the second power threshold $P_2$ and the first power threshold $P_1$. If so, the method 400 proceeds to step 416, where the controller 220 causes the pump controller/driver 216 to perform a pump power adjustment in the optical amplifier 204 and the Raman pumps 206 and 208. Specifically, the power monitor 212 coupled to the input of the optical amplifier 204 reads the new input power, and the optical signal output power of the optical amplifier 204 (determined by the power monitor 212 coupled at the output) is adjusted to maintain the desired power per channel. The second transient threshold $P_2$ is selected to be the threshold level of input power change that requires immediate adjustment of pump and amplifier settings in the network element, instead of waiting for the periodic adjustment that would occur as a result of a scan by the OSA 202.

If the input power change is greater than the first power threshold $P_1$, the method 400 proceeds to step 418. Specifically, the OSA 202 determines the channel population of the optical signal. At step 420, the supervisory control circuitry 218 notifies the downstream network elements of the detected transient substantially as described above with respect to step 312 of the method 300. Of course other notification methods can also be used. At step 422, new pump signal powers for the Raman pumps 206 and 208 are determined. In one embodiment, the pump power of Raman pumps 206 and 208 is adjusted based on extrapolation from existing pump settings for the last non-zero channel population using the current channel population, rather than based on an attempt to correct measured power levels. In addition, the pump signal power in the optical amplifier 204 is also adjusted at step 422.

At optional step 424, the OSA 202 will determine the channel population of the optical signal for a second time. If the channel population is unchanged, the method proceeds to end step 426. If the channel population has changed, pump re-adjustment is performed substantially as described above with respect to step 422. The method 400 then proceeds to end step 426.

In other embodiments of the invention, more than two threshold levels are used (i.e., $P_1, P_2, \ldots P_N$). In these embodiments, the various threshold levels are preferably selected with respective changes in input power levels. The response of a given network element is based upon which threshold has been exceeded. For example, in addition to the two thresholds described above, there could be a third threshold in between the first and second thresholds. If the input power to a network element exceeded this third threshold (but is less than the higher first threshold), then the network element could adjust the power of the optical signal locally, and transmit a transient notification to a subset of network elements less than that which would be notified if the power level exceeded the higher first threshold. That is, the number of additional network elements notified of the transient can vary based upon a particular threshold that has been exceeded. In this embodiment, the method 400 of FIG. 4 is modified to accommodate additional threshold level comparisons and additional control actions.

Methods 300 and 400, along with the alternative embodiments of those methods, are performed by a given network element in response to a transient input to the network element, or in response to a transient notification sent from another network element. When a given network element receives notification that a transient occurred upstream, that network element executes steps 418, 420, 422, and optionally 424 of method 400. In addition, those skilled in the art will appreciate that steps 418, 420, 422, and optional step 424 may be performed in a different order, and/or simultaneously as desired.

As previously described, the principles of the present invention can also be advantageously used to control optical signal power supplied by other optical components even though the above embodiments were described only in the context of optical amplifiers. For example, the present invention can be used to control power levels of optical pumps in dispersion compensation modules or lasers in optical transmitters. Thus, while the foregoing is directed to the preferred embodiment of the present invention, other and further embodiments of the invention may be devised without departing from the basic scope thereof, and the scope thereof is determined by the claims that follow.

The invention claimed is:

1. A method, comprising:
   determining a power level of an optical signal at a first network element;
   adjusting power of the optical signal at the first network element, in response to the power level exceeding a first threshold;
   transmitting a transient notification to at least one additional network element, in response to the power level exceeding a second threshold, the second threshold being greater than the first threshold; and
   adjusting power of the optical signal at the at least one additional network element in response to the transient notification.

2. The method of claim 1, wherein the step of adjusting power comprises adjusting output power supplied by at least one gain element to achieve a desired power per optical channel of the optical signal.

3. The method of claim 2, wherein the step of adjusting output power supplied by at least one gain element comprises:
   determining a current channel population of the optical signal;
   adjusting pump power supplied by at least one pump source; and
   adjusting gain supplied by at least one optical amplifier.

4. A network element adapted for use in an optical transmission system, the network element comprising:
   a power monitor, for determining an input power level of an optical signal input to the network element;
   at least one gain element, for adjusting power of the optical signal; and
   a controller, for controlling the power adjustment provided by the at least one gain element to achieve a desired power per channel of the optical signal in response to the input power level exceeding a first threshold, and transmitting a transient notification to at least one additional network element of the optical transmission system in response to the input power level exceeding a second threshold, the second threshold being greater than the first threshold.

5. The network element of claim 4, wherein the at least one gain element comprises at least one of an optical amplifier and an optical pump source.

6. In a lightwave communication system having a plurality of network elements for supplying an optical signal adapted for transmission in an optical fiber path, an apparatus for controlling power of an optical signal propagating in the optical fiber path comprising:
   means for detecting input power transient in a first network element; and
   a first transient control circuit, responsive to a detected input power transient, for adjusting power of the optical signal in the first network element in response to the input power transient exceeding a first threshold, and transmitting a transient notification to at least one additional network element in response to the input power transient exceeding a second threshold, the second threshold being greater than the first threshold.

7. The apparatus of claim 6, further comprising:
   means for detecting a transient notification in the at least one additional network element; and
   at least one additional transient control circuit, responsive to a detected transient notification, for adjusting the power of the optical signal in the at least one additional network element.

8. The apparatus of claim 6, wherein the first transient control circuit adjusts the power of the optical signal by adjusting output power of at least one gain element in the first network element to achieve a desired power per channel of the optical signal.

9. The apparatus of claim 8, wherein the at least one gain element comprises at least one of an optical amplifier and an optical pump source.

* * * * *